United States Patent [19]

Perl

[11] E Re. 29,853

[45] Reissued Nov. 28, 1978

[54] GAS IGNITER

[75] Inventor: Richard L. Perl, Mansfield, Ohio

[73] Assignee: The Tappan Company, Mansfield, Ohio

[21] Appl. No.: 713,340

[22] Filed: Aug. 11, 1976

Related U.S. Patent Documents

Reissue of:

[64] Patent No.: 3,842,319
Issued: Oct. 15, 1974
Appl. No.: 290,256
Filed: Sep. 18, 1972

U.S. Applications:

[63] Continuation-in-part of Ser. No. 223,451, Feb. 4, 1972, abandoned.

[51] Int. Cl.[2] ..... F23Q 7/00

[52] U.S. Cl. ..... 219/270; 338/330; 361/266; 431/262

[58] Field of Search ..... 13/20, 25; 317/79, 98; 219/264, 270, 543, 553, 267; 29/25, 14, 611, 619, 498, 630, DIG. 39; 126/39; 338/2, 237, 322, 330, 332; 136/203; 403/265; 431/262; 123/145

[56] References Cited

U.S. PATENT DOCUMENTS

| | | | |
|---|---|---|---|
| 1,735,809 | 11/1929 | Tebyrica | 29/DIG. 39 |
| 2,005,897 | 6/1935 | Knowles | 403/265 |
| 2,205,145 | 6/1940 | Klingner | 317/98 X |
| 2,404,841 | 7/1946 | Hess et al. | 317/98 |
| 2,492,755 | 12/1949 | McCollum | 317/98 |
| 2,708,701 | 5/1955 | Viola | 338/332 X |
| 2,944,239 | 7/1960 | Schrewelius | 338/322 |
| 3,220,097 | 11/1965 | Griest | 29/619 |
| 3,269,806 | 8/1966 | Fitzer et al. | 338/330 X |
| 3,272,659 | 9/1966 | Bassett, Jr. et al. | 136/203 |
| 3,307,136 | 2/1967 | Fitzer et al. | 338/322 |
| 3,314,033 | 4/1967 | Wnuk, Jr. | 338/2 |
| 3,372,305 | 3/1968 | Mikulec | 317/98 |
| 3,397,375 | 8/1968 | Casper et al. | 338/330 |
| 3,458,766 | 7/1969 | Little | 317/98 |
| 3,467,812 | 9/1969 | Terrell | 317/98 X |
| 3,662,222 | 5/1972 | Ray | 317/98 |
| 3,769,689 | 11/1973 | Little | 29/498 |
| 3,823,345 | 7/1974 | Mitts et al. | 219/267 |

OTHER PUBLICATIONS

*Metco Metallizing Handbook*, H. S. Ingham and A. P. Shepard, copyright 1959, pp. A-190 through A-193.

*Primary Examiner*—J. V. Truhe
*Assistant Examiner*—Clifford C. Shaw
*Attorney, Agent, or Firm*—Maky, Renner, Otto & Boisselle

[57] ABSTRACT

A solid-state silicon carbide gas igniter to which electrical leads are bonded for energization by flame or plasma spraying as used for hardfacing alloys, metals and ceramics, the leads being received in slots in the igniter terminal parts and the latter, with the thus inserted leads, encased or coated by the spray bonding material. In applying such material, the centerline of the spray is directed at an angle of approximately 45° toward the terminal end of the igniter while the latter is preferably relatively rotated to provide the material coating fully about the terminal parts of the igniter and the inserted leads.

20 Claims, 5 Drawing Figures

GAS IGNITER

Matter enclosed in heavy brackets [ ] appears in the original patent but forms no part of this reissue specification; matter printed in italics indicates the additions made by reissue.

This application is a continuation-in-part of my pending application Ser. No. 223,451, filed Feb. 4, 1972, now abandoned.

It is, more particularly, concerned with an improved solid-state silicon carbide gas igniter of the type shown in such co-pending application in which it is there shown in association with a particular type of gas stove burner assembly. However, it should be understood, and will become readily evident from the following, that the new igniter is not limited to use in such an appliance, but has wider applicability in gas-ignition systems in either cyclical or continuous operating modes.

The previously available silicon carbide igniters presented problems in the attachment of the leads or electrical connectors for energizing the same where such connections were exposed to fairly high temperatures, for example, on the order of 1,400° F, since the joints were effected by ordinary flame spraying of aluminum and failed under the noted high temperature exposure. Securing of the leads to the igniter by means of silver soldering over a thin nickel or stainless steel coating was found likewise unsatisfactory, in this case, because of the substantial difference in thermal expansion which occured between the silicon carbide and the solder. For these reasons, as explained in the aforesaid co-pending application, high temperature plasma and flame spraying were tested and found successful, that is, as providing for the first time reliable connections of the leads to the igniter under the relatively severe operating temperatures required.

The technique of plasma spray coating is, of course, well-known and, briefly, comprises the injection of powders into an arc, together with a flow of gas through the arc region to carry the material to the surface on which deposition and bonding takes place. The powders are melted, vaporized and deposited on the substrate where they freeze and form a tightly bonded coat, the surface being effectively pre-roughened and the melt freezing into the surface imperfections, with some metallurgical bonding also occurring. For further details and illustration of typical plasma spray apparatus, reference may be had to the herein incorporated disclosure thereof found in "The Plasma State," by E. J. Hellund, published in 1961 by Reinhold Publishing Corp., N.Y., and particularly pages 167–170 of such work. High temperature flame spraying, for example, as carried out with apparatus available from METCO INC., Westbury, N.Y., which also supplies plasma spray equipment and coating materials for both methods, will provide like results, at a lower temperature than the latter but still well above the noted 1,400° F desired for the end coating.

The present improvement has as a further primary objective an improved configuration of the bond produced by such spray coating of the electrical leads to the igniter body.

An additional object is to provide such an igniter by using a preferred method for producing such a bonded electrical lead attachment thereto.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
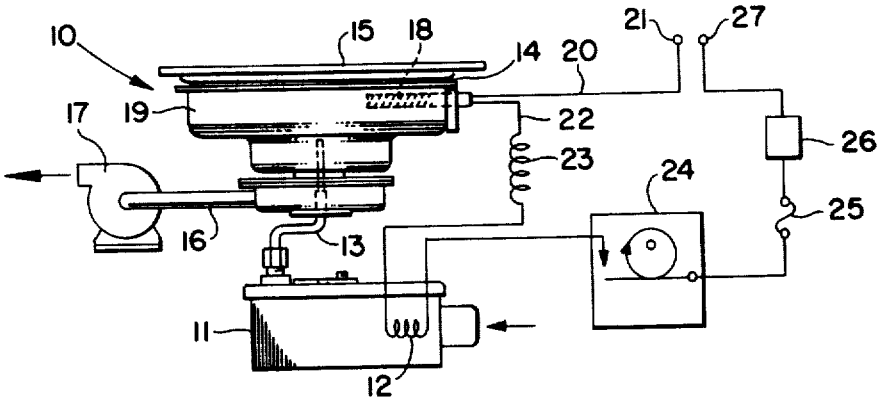
FIG. 1 is a schematic diagram of gas burner apparatus using the improved igniter as shown in the above-referenced co-pending application.

Referring now to the drawing in detail, the illustrative range gas burner shown in FIG. 1 and designated generally by reference numeral 10 is fully described in the above-noted co-pending application and reference may be had thereto, if desired, for details of the internal construction of the burner and its operation. For present purposes, it will be pointed out that this burner receives the gaseous fuel to be combusted from an available source through a thermal fuel valve 11 having an electrical resistance element 12 as its actuator and a pipe 13 extending from the output side of the valve to the interior of the burner. Combustion air is supplied through a peripheral opening 14 about the top of the burner housing and beneath, in this assembly, a glass ceramic top 15 on which pots and pans and other utensils are supported for heating by the burner.

There is, moreover, an exhaust line 16 leading from the burner to a discharge blower 17, so that this particular burner is of powered type operating under negative pressure.

The burner is ignited by a glow coil element 18 of solid state silicon carbide the terminal end of which extends as illustrated outside of the burner housing 19. One lead or wire 20, for example, of nichrome extends to a terminal 21 of an electrical energy source, while the other igniter connecting lead 22 is in electrical series with a ballast coil 23, the resistance actuator element 12 of the thermal valve 11, a variable duty cycle motor driven mechanical switch 24, a fuse 25, and an air switch 26 to the other energy source terminal 27. The air switch in this system is intended and operative to preclude operation of the burner unless the exhaust blower is operating, as a safety interlock feature.

The igniter element 18 comprises in effect a helically wound body 28 of the silicon carbide, as a double helix, and has as terminal portions two semicircular and spaced apart extensions 30, 31 *having oppositely facing outer exterior and interior surfaces joined together at the side edges thereof.* This configuration of the element is known and available, for example, from the Carborundum Company.

Figure 2:
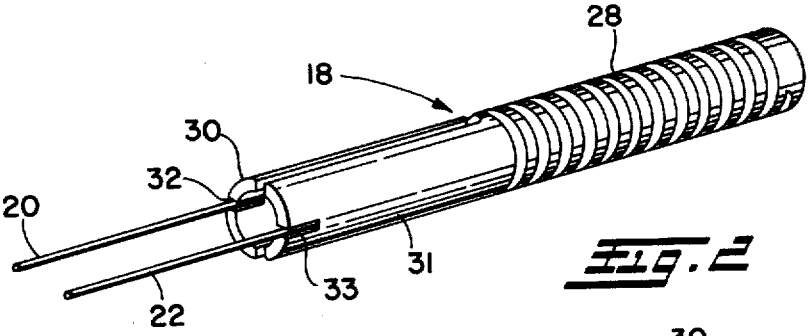
FIG. 2 is a perspective view of the igniter body with its connecting leads in place but not yet bonded.
Figure 3:
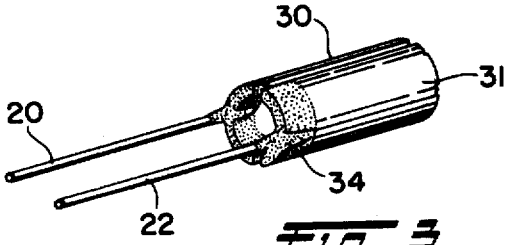
FIG. 3 is a fragmented comparable perspective of the igniter after bonding of the leads in accordance with the invention.
Figure 4:
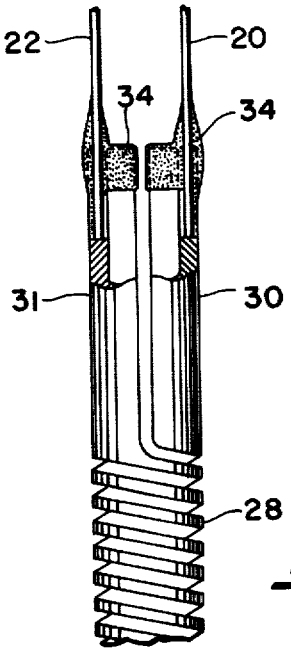
FIG. 4 is a fragmentary elevation of the completed igniter, with the attached lead end shown in cross section.

However, in accordance with the present improvements, the ends of the terminal parts 30, 31 of the igniter are provided with diametrically opposite and centered slots 32, 33 into which the connecting leads 20 and 22 for energization are inserted *to provide appreciable direct overlapping interengagement between the terminal portions of the leads and the igniter terminal parts.* As indicated previously, this area of connection is in a fairly high temperature environment and the leads are bonded to the igniter body in such placement by high temperature flame or plasma spraying. More particularly, the preassembly illustrated in FIG. 2 is subjected to such metallizing spray, with the centerline of the spray, which is typically cone shaped, directed at the terminal end of the body preferably at an angle of approximately 45° while the body with its inserted leads is rotated fully. This operation produces the bonding shown in the remaining figures, with a slight [built-up] *build-up* of sprayed material 34 in the area of the igniter end about the leads and tapering longitudinally in both directions, as shown most clearly in FIG. 4. Moreover, the described application of the bonding material results in the same being adhered fully peripherally about the igniter terminals 30, 31, with the extent of the application to the interior surfaces as well as the exterior and the edges of such parts being achieved by the noted direction of the spray and of somewhat lesser longitudinal extent at the interior surfaces due to the partial shielding of the latter which occurs.

Figure 5:
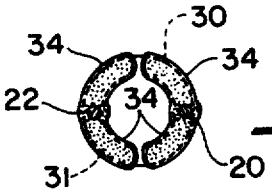
FIG. 5 is an end view of the connector end of the new igniter.

As shown most clearly in FIG. 5, the sprayed material 34 not only secures the inserted leads in place *with respect to the appreciably larger size terminal parts of the igniter,* but thus fully and continuously encases the terminal parts of the igniter for an extremely secure and reliable attachment of the leads.

Various powders for producing the sprayed coating are commercially available, with one found successful having a composition of nickel, chrome, and aluminum. This material is available from METCO INC. as METCO 443, METCO 450, and METCO 451, the last being somewhat more exothermic and the first (75 percent Ni; 19 percent Cr; 6 percent Al) most closely approximating expansivity of the particular silicon carbide tested.

Another source of apparatus and powders is Plasmaydne Division of Geotel, Inc., Santa Ana, Cal., and METCO INC. also supplies other powders specifically for the flame spraying technique in which, as is known, only oxygen and acteylene are used and the cost thus somewhat reduced as compared to plasma spraying. The aforenoted illustrative METCO powders can be used as well for flame spraying, although very high temperature materials must be plasma sprayed.

The disclosed high temperature spraying or metallizing fully meets the desideratum of withstanding temperatures on the order of 1,400° F or even higher, which cannot be realized with the conventional aluminum spray, and the total encasement of the leads eliminates any problem of failure, such as by spalling, due to differential thermal expansion of the materials.

Also unlike the conventional igniter, there is no need for clips between the leads and the igniter terminals.

The inserted leads instead of being round and straight as shown, can be of ribbon form and include a crimp or a rebent inner end adding a spring engagement in the slots to assist in holding them more firmly in place if needed during the metallizing operation.

It will also be clear to those skilled in the art that this improved igniter assembly can be used for long service life in all types of gas-fired domestic appliances, water heaters, laundry dryers, furnaces and the like and, additionally, as a source of infrared heat where spot or localized heating is desired. The igniters, as is known, can operate over a temperture range of about 2,100° to 2,400° F. The plasma arc spraying as described can be conducted with the igniter either pre-heated or at room temperature, with the leads ordinarily made of nichrome, as previously indicated in the different forms thereof. The igniter itself can be made of other materials than the described silicon carbide, e.g., molybdenum di-silicide or combinations of these and comparable available materials.

I, therefore, particularly point out and distinctly claim as my invention:

1. The improvement in high temperature gas igniters *comprising an igniter body* having discrete spaced-apart terminal parts for connection to a source of electric energy, [which comprises] a plurality of electrical leads positioned in *appreciable direct overlapping* conductive [engagement] *interengagement* with respective ones of said terminal parts, said electrical leads extending from said terminal parts for such connection of the igniter and said electrical leads being of low electrical resistance relative to that of the igniter, and respective metallized coatings [having a coefficient of expansion approximating that of the terminal parts] about the respective leads and terminal parts in such conductive engagement [bonding] *and of such area as to effectively bond* the former to the latter respectively, while maintaining the spaced and hence electrically insulated relation thereof.

2. The improved gas igniter set forth in claim 1, wherein *each of said terminal parts has oppositely facing outer surfaces and* the metallized coatings extend substantially completely over [at least the exterior and the interior] *portions of said* surfaces [of the interengaged igniter terminal parts] and over the electrical leads [to further enhance the bonding of] *proximate the area of such interengagement thereof so as to effectively bond* the leads to the igniter in high temperature exposure of such connections thereof.

3. The improved gas igniter set forth in claim 2, wherein *said terminal parts have side edges joining said oppositely facing outer surfaces, and* the metallized coatings fully continuously encase [the] *portions of said* terminal parts, including the side edges thereof *fully around the periphery thereof,* and the leads in engagement with the same.

4. The improved gas igniter set forth in claim [2] *1*, wherein the igniter is [in coil form and] made of [a material having the properties of] silicon carbide, *and said leads are metal.*

5. The improvement in high temperature gas igniters *comprising an igniter body* having discrete spaced-apart terminal parts *at least one end* for connection to a source of electric energy, [which comprises] electrical leads in conductive engagement with and extending from said terminal parts for such connection of the igniter, and metallized coatings about the leads and *terminal* parts in such *conductive* engagement [bonding] *and of such area as to effectively bond* the former to the latter, respectively, while maintaining the spaced and hence electrically insulated relation thereof, [the metallized coatings extending substantially completely over at least the exterior and the interior surfaces of the interengaged igniter terminal parts and over the electrical leads to further enhance the bonding of the leads to the igniter in high temperature exposure of such connections thereof,] the igniter being in coil form and made of a material having [the] *electrical* properties [of] *similar to* silicon carbide, and wherein [the] *said* igniter terminal parts are arcuate, [at the same end thereof,] *each said igniter terminal part including exterior and interior surfaces,* the electrical leads being received in longitudinal slots formed [therein] *in said parts,* and the metallized coatings extending over *portions of* the exterior and interior surfaces of said parts *and electrical leads proximate the area of such conductive engagement,* thereby to enclose the leads within the terminal parts.

*6. The improved gas igniter set forth in claim 1, wherein the metallized coatings fully continuously encase portions of the terminal parts and the leads proximate the area of such interengagement thereof fully around the periphery of said terminal parts.*

*7. The improved gas igniter set forth in claim 6, wherein said respective terminal parts are appreciably larger in cross-sectional area than the cross-sectional area of said respective electrical leads.*

*8. The improved gas igniter set forth in claim 4, wherein said metallized coatings are exothermic.*

*9. The improved gas igniter set forth in claim 8, wherein said metallized coatings are a composition comprising nickel, chrome, and aluminum.*

*10. The improved gas igniter set forth in claim 9, wherein the aluminum content of said composition is about 6%.*

*11. The improved gas igniter set forth in claim 10, wherein the nickel content of said composition is about 75% and the chrome content is about 19%.*

*12. The improved gas igniter set forth in claim 1, wherein the respective metallized coatings have a coefficient of expansion approximating that of the terminal parts.*

*13. The improvement in high temperature gas igniters comprising an igniter body having discrete spaced-apart terminal parts for connection to a source of electric energy, a plurality of electrically conductive means positioned in conductive engagement with respective ones of said terminal parts for connecting the igniter to such source of electric energy, said electrically conductive means being of low electrical resistance relative to that of the igniter, at least one of said electrically conductive means including a terminal portion in appreciable direct overlapping interengagement with a respective one of said terminal parts, and metallized coating means about the terminal portion of the respective electrically conductive means and terminal parts in such conductive appreciable direct interengagement and of such area as to effectively bond the former to the latter while maintaining the spaced and hence electrically insulated relation between said terminal parts.*

*14. The improved gas igniter set forth in claim 13, wherein said metallized coating means extends beyond the interengagement of said electrically conductive means and igniter terminal part so as to fully continuously encase portions of the igniter terminal part and electrically conductive means proximate the area of such interengagement thereof.*

*15. The improved gas igniter set forth in claim 14, wherein said metallized coating means is thicker in the area of said interengagement and extends in longitudinally tapered form in both directions on said igniter terminal part and electrically conductive means.*

*16. The improved gas igniter set forth in claim 13, wherein each of said electrically conductive means includes a terminal portion in appreciable direct interengagement with a respective one of said terminal parts, and metallized coating means about the terminal portions of the respective electrically conductive means and terminal parts in such conductive appreciable direct interengagement and of such area as to effectively bond the former to the latter while maintaining the spaced and hence electrically insulated relation between said terminal parts.*

*17. The improved gas igniter set forth in claim 16, wherein said metallized coating means fully continuously encase portions of the terminal parts and terminal portions in engagement with the same at and proximate the area of such interengagement thereof.*

*18. The improvement in high temperature gas igniters comprising an igniter body having discrete spaced-apart terminal parts for connection to a source of electric energy, a plurality of electrical leads positioned in conductive engagment with respective ones of said terminal parts, said electrical leads extending from said terminal parts for such connection of the igniter and said electrical leads being of low electrical resistance relative to that of the igniter, and respective metallized coatings about the portions of the respective leads and terminal parts in such conductive engagement and of such area as to effectively bond the former to the latter respectively, while maintaining the spaced and hence electrically insulated relation thereof, said metallized coatings having a coefficient of thermal expansion of a magnitude sufficiently close to that of said terminal parts to assure the integrity of the mechanical bond among the respective terminal parts, electrical leads, and metallized coatings over a relatively large range of temperatures.*

*19. The improvement in high temperature gas igniters comprising an igniter body having discrete spaced-apart terminal parts for connection to a source of electric energy, a plurality of electrically conductive means positioned in conductive engagement with respective ones of said terminal parts for connecting the igniter to such source of electric energy, said electrically conductive means being of low electrical resistance relative to that of the igniter, said electrically conductive means including terminal portions in appreciable direct interengagement with a corresponding surface of a respective one of said terminal parts, and metallized coating means about the respective electrically conductive means and terminal parts in such conductive appreciable direct interengagement and of such area as to effectively bond the former to the latter while maintaining the spaced and hence electrically insulated relation between said terminal parts, each of said terminal parts including a respective longitudinal slot, said terminal portions of said electrically conductive means being positioned in said slots in such appreciable direct interengagement with respective terminal parts, and said metallized coating means respectively extending over the surfaces of said terminal parts and said terminal portions at the area of such interengagement thereof, thereby to enclose the terminal portions of the electrically conductive means within the terminal parts.*

*20. The improved gas igniter set forth in claim 19, wherein each of said terminal parts is appreciably larger in cross-sectional area than the cross-sectional area of said terminal portions.*

* * * * *